(12) United States Patent
Haaser (10) Patent No.: US 6,328,330 B1
(45) Date of Patent: Dec. 11, 2001

(54) HAND TRUCK ATTACHMENT FOR A LADDER

(76) Inventor: Gregory John Haaser, 15016 Oakcrest Ct., Dumfries, VA (US) 22026

( * ) Notice: Subject to any disclaimer, the term of this patent is extended or adjusted under 35 U.S.C. 154(b) by 0 days.

(21) Appl. No.: 09/561,988

(22) Filed: May 2, 2000

(51) Int. Cl.$^7$ ....................................................... B62B 1/04
(52) U.S. Cl. ...................... 280/645; 280/30; 280/47.29; 280/643; 182/21
(58) Field of Search .................................. 280/30, 47.27, 280/47.28, 47.29, 47.18, 47.24, 643, 645, 651, 652; 182/20, 21, 104; 248/231.61, 231.21, 316.1, 316.6

(56) References Cited

U.S. PATENT DOCUMENTS

| | | | |
|---|---|---|---|
| 310,836 | * 1/1885 | Lowen | 182/20 |
| 680,402 | 8/1901 | Van Court . | |
| 867,754 | * 10/1907 | Randall | 182/20 |
| 1,116,779 | 11/1914 | Witt . | |
| 1,185,515 | 5/1916 | McCrystle . | |
| 1,601,250 | * 9/1926 | Hilderbrand | 280/30 |
| 2,788,930 | 4/1957 | Pals . | |
| 2,922,487 | 1/1960 | Reitknecht . | |
| 2,990,764 | 7/1961 | Wilder . | |
| 3,020,972 | 2/1962 | Hockett . | |
| 3,104,889 | * 9/1963 | Branch, Jr. | 280/47.16 |
| 3,430,972 | * 3/1969 | Fiedler | 280/47.27 |
| 3,954,155 | 5/1976 | Guidara . | |
| 4,009,762 | 3/1977 | Bjerkgard . | |
| 4,049,283 | 9/1977 | Brookes et al. . | |
| 4,106,590 | 8/1978 | Tarran . | |
| 4,166,601 | * 9/1979 | Kato | 248/226.3 |
| 4,258,826 | * 3/1981 | Murray | 182/20 |
| 4,448,282 | 5/1984 | Giezendanner . | |
| 4,494,626 | 1/1985 | Ast . | |
| 4,676,468 | 6/1987 | Preston et al. . | |
| 4,919,379 | * 4/1990 | Goetz | 248/231.6 |
| 4,934,485 | * 6/1990 | Purkapile | 182/20 |
| 5,382,032 | 1/1995 | Wilson . | |
| 5,727,799 | 3/1998 | DiSario . | |
| 5,836,595 | 11/1998 | Brice . | |
| 6,158,749 | * 12/2000 | Roudebush | 280/47.16 |
| 6,173,811 | * 1/2001 | Tornabene et al. | 182/20 |

* cited by examiner

Primary Examiner—Daniel G. DePumpo
Assistant Examiner—J. Allen Shriver
(74) Attorney, Agent, or Firm—Birch, Stewart, Kolasch & Birch, LLP (57) ABSTRACT

A device for attaching to a ladder allows the ladder to function as a hand truck. The device includes a pair of retractable wheels. The retractable wheels can be stored away inside an outer profile of an opened or closed stepladder, so that the wheels do not interfere with a user when the ladder is opened and do not take up space when the ladder is closed. The device may also include a retractable carry platform for holding loads when the ladder is used as a hand truck. A reverse side of the carry platform can serve as a paint bucket support or work surface when the ladder is in use. Both the retractable wheels and the retractable carry platform are attached to the ladder by a frictional engagement which does not violate the structural integrity of the ladder.

21 Claims, 9 Drawing Sheets

HAND TRUCK ATTACHMENT FOR A LADDER

BACKGROUND OF THE INVENTION

1. Field of the Invention

The present invention relates to devices for attaching to a ladder, and to ladders in combination with such devices. More specifically, the present invention relates to a wheeled attachment for a ladder, to allow the ladder to function as a hand truck.

2. Description of the Relevant Art

Service persons, such as electricians, plumbers, and heating and air conditioning mechanics, often work at sites remote from their shops or offices. Typically, tools and materials are transported to the work site using a service truck. Also, it is common that many jobs require the use of a stepladder.

Once the service truck is driven and parked close to the work site, the stepladder, tools and materials for the specific job must be carried from the service truck to the work site. When working in a location remote from the parking area, significant time is consumed carrying the stepladder, tools and materials to the work site. For example, one trip between an upper floor of a high rise building and a remote parking location can take more than half an hour. If several trips are required to bring the step ladder and all the necessary tools and materials to the work site, the total cost of the work is greatly increased. Therefore, the fewer trips required between the service truck and the work site, the more cost effectively the work can be performed.

One solution to carrying a stepladder, tools and materials between the service truck and the work site would be to use a hand truck. A hand truck offers a great conveyance, and eases the burden of the service person. However, if a service person were to use a hand truck, this would require that a hand truck be carried in the service truck. It is well known that space inside a service truck is limited, and often completely accounted for in accommodating the necessary stepladder, tools and materials.

To this end, a piece of equipment consolidating a stepladder and a hand truck has been proposed in the background art. U.S. Pat. No. 5,382,032, issued on Jan. 17, 1995 to James R. Wilson, and U.S. Pat. No. 3,954,155, issued on May 4, 1976 to Orlando Guidara, both illustrate a stepladder with wheels, which can function as a hand truck. Unfortunately, the devices of the background art suffer drawbacks.

Both references disclose fixed wheels, which protrude away from a top portion of the ladder. When a person uses the stepladder, the placement of the wheels encroaches on the user's upward movement. The encroachment forces the user to lean away from, rather than into the stepladder, especially as the user ascends higher on the ladder. Good safety practices recommend that a user should lean into, rather than away from, the ladder.

Another drawback is that the protruding, fixed wheels can be an obstacle to the user, and push against a user's body, when standing on the ladder and trying to reach to the sides of the ladder. If the wheels protrude above the top of the ladder, the wheels will interfere with placing and balancing a flat object, such as a board or a saw, on the flat top surface platform of the ladder.

Yet, another drawback is that the wheels are exposed in a prominent location at the top of the ladder, when the ladder is in use. If a user lost their balance, the user might grasp for the wheels to regain their balance. Since the wheels are rotatable, they would not lend themselves well for grasping in an emergency.

Another significant drawback is the positioning of the fixed wheels outside the limits of the side rails. In other words, the outer profile, or footprint, of the ladder is altered by the wheels when the ladder is folded up for storage. This arrangement requires additional space for storing the background art's device in a service truck. Further, the background art's device may not fit into a standard ladder rail, often provided on the top or side of a service truck.

SUMMARY OF THE INVENTION

The present invention has as a primary object to solve one or more of the drawbacks associated with the background art.

It is an object of the present invention to provide a device for attachment to a ladder, which allows the ladder to function as a hand truck, wherein a wheel assembly is located so as to be remote from a person on the ladder in order to not interfere with the person's use of the ladder.

It is a further object of the present invention to provide a device for attachment to a ladder, which allows the ladder to function as a hand truck, wherein a wheel assembly is located so to be remote from a top of the ladder in order to not interfere with the use of the top of the ladder.

It is an even further object of the present invention to provide a device for attachment to a ladder, which allows the ladder to function as a hand truck, wherein the device does not significantly change an outer profile of the ladder when the ladder is in a storage condition.

Moreover, it is an object of the present invention to provide a device for attachment to a ladder, which allows the ladder to function as a hand truck, wherein the device attaches to the ladder without structurally altering the ladder.

These and other objects are accomplished by a combination comprising: a ladder including a plurality of steps; and an assembly attached proximate an end of said ladder, said assembly including: a pivotable linkage, said pivotable linkage being pivotable between a first position and a second position relative to said ladder; and at least one wheel mounted to said pivotable linkage.

Further, these and other objects are accomplished by an assembly for attachment to a ladder, said assembly comprising: a base for fixing proximate an end of the ladder; a pivotable linkage attached to said base, said pivotable linkage being pivotable between a first position and a second position relative to said base; and at least one wheel mounted to said pivotable linkage.

Moreover, these and other objects are accomplished by an assembly for attachment to a ladder, said assembly comprising: a base for fixing proximate an end of the ladder, said base including a first bracket and a second bracket, said first bracket for abutting one side of a first rail of the ladder, said second bracket for abutting another side of the first rail of the ladder, and at least one first fastener for connecting said first bracket to said second bracket in order to frictionally fix said first bracket and said second bracket to the first rail of the ladder; a linkage attached to said first bracket; and at least one wheel mounted to said linkage.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
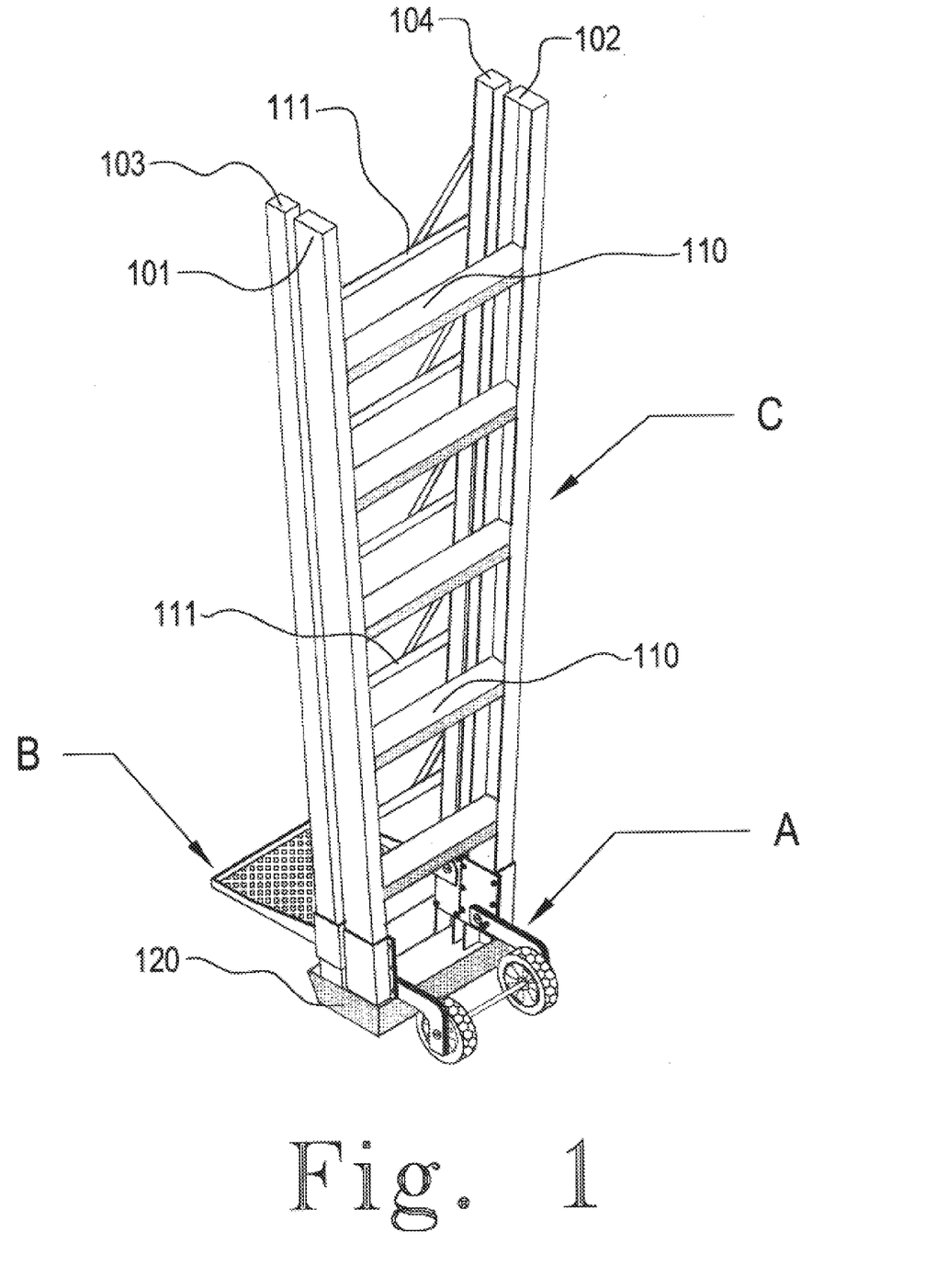
FIG. 1 is a perspective view of ladder in a hand truck mode, in accordance with the present invention.

FIG. 1 is a perspective view of an A-frame type stepladder C in a closed and inverted position. The ladder C includes a landing gear assembly A and a carry plate assembly B. The landing gear assembly A and the carry plate assembly B are illustrated in deployed conditions. When the landing gear assembly A and the carry plate assembly B are in the deployed conditions, and the ladder C is closed and inverted, the ladder C is considered to be in a hand truck mode. In the hand truck mode, the ladder C can be used for carrying items on the carry plate assembly B.

Figure 2:
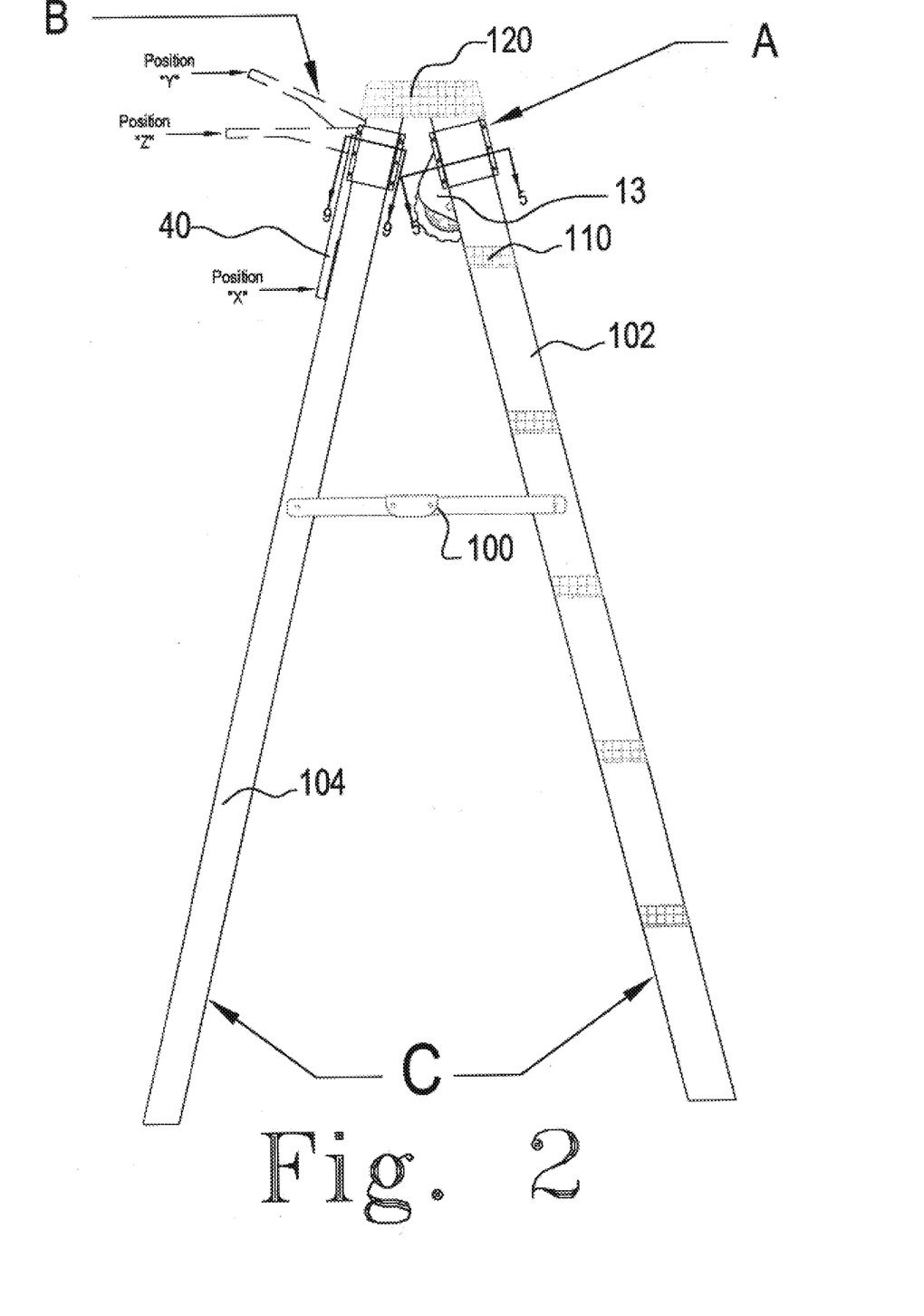
FIG. 2 is a side view of a ladder in a ready-for-use mode.

FIG. 2 is a side view of the ladder C in an open and upright position. The landing gear assembly A and the carry plate assembly B are illustrated in retracted conditions. When the landing gear assembly A and the carrying plate assembly B are in the retracted conditions, and the ladder C is opened and upright, the ladder C is considered to be in a ready-for-use mode. In the ready-for-use mode, the ladder C can be used as a conventional ladder, such that a user can climb on the ladder C. When the landing gear assembly A and the carrying plate assembly B are in the retracted conditions, and the ladder is folded together, the ladder is in a storage mode.

The ladder C includes such conventional ladder structural elements as: a first step side rail 101; a second step side rail 102; a first brace side rail 103; a second brace side rail 104; a plurality of steps 110 connected between the first and second step side rails 101 and 102; a plurality of cross braces 111 connected between the first and second brace side rails 103 and 104, a top cap 120 connecting the first and second step side rails 101 and 102 and the first and second brace side rails 103 and 104 together; and a couple of locking braces 100 connected between the first step side rail 101 and the first brace side rail 103 and between the second step side rail 102 and the second brace side rail 104, respectively. Although several specific structural elements of one type of conventional ladder have been illustrated, it should be noted that the landing gear assembly A and carry plate assembly B, of the present invention, can be applied to any type of conventional or inventive ladder.

Figure 3:
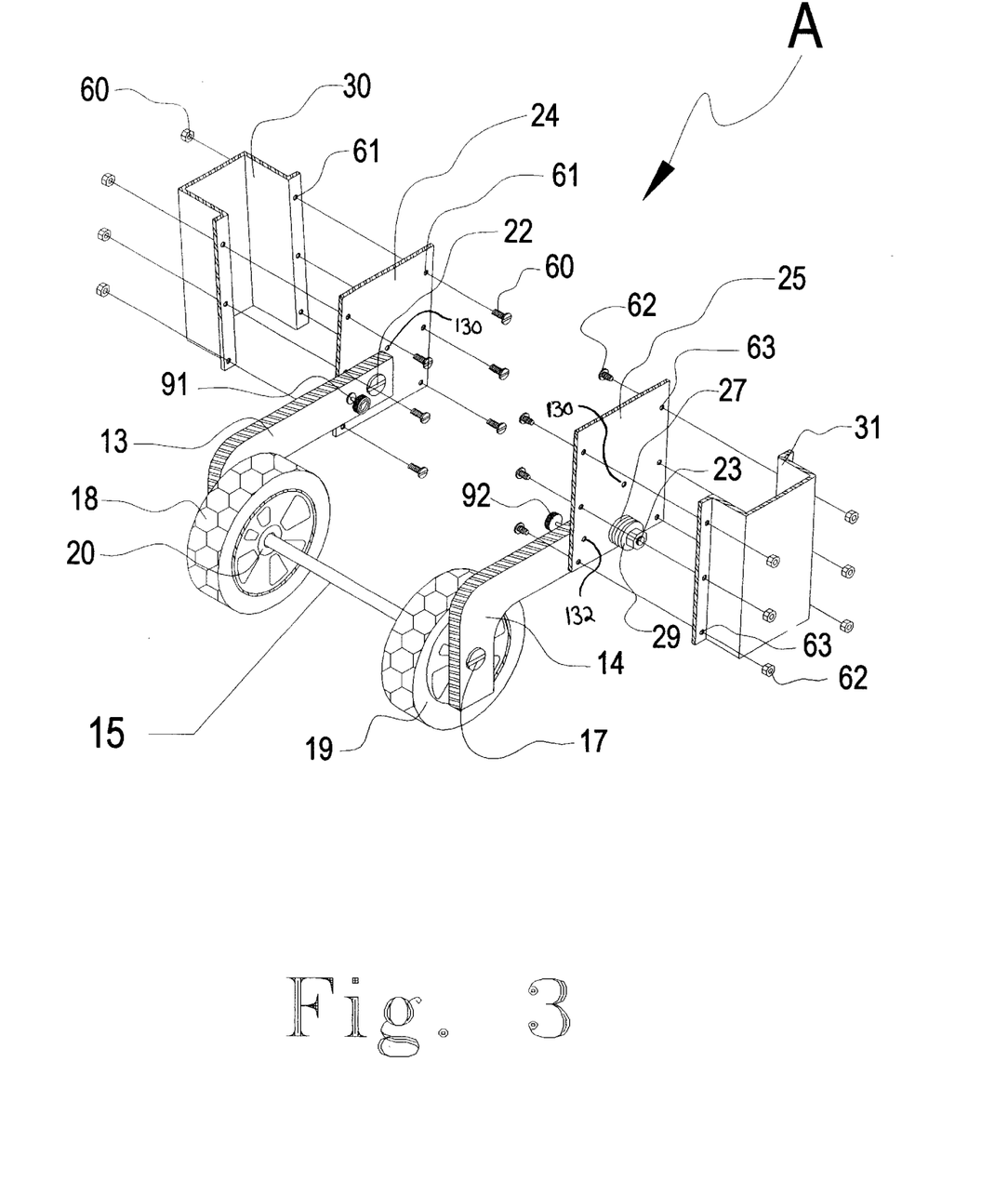
FIG. 3 is an exploded view of a landing gear assembly.
Figure 4:
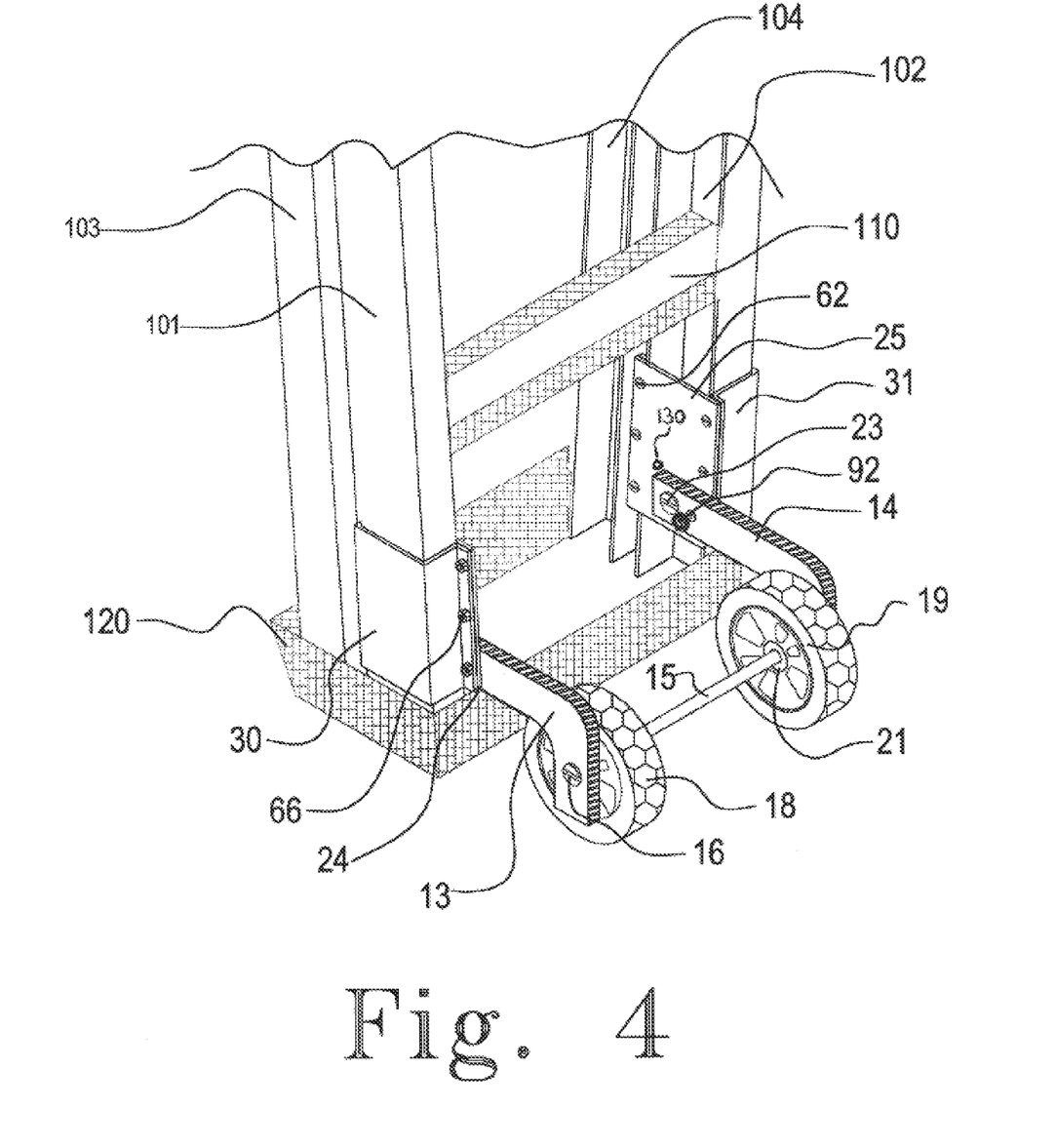
FIG. 4 is a close-up view of the landing gear assembly in a deployed condition.
Figure 5:
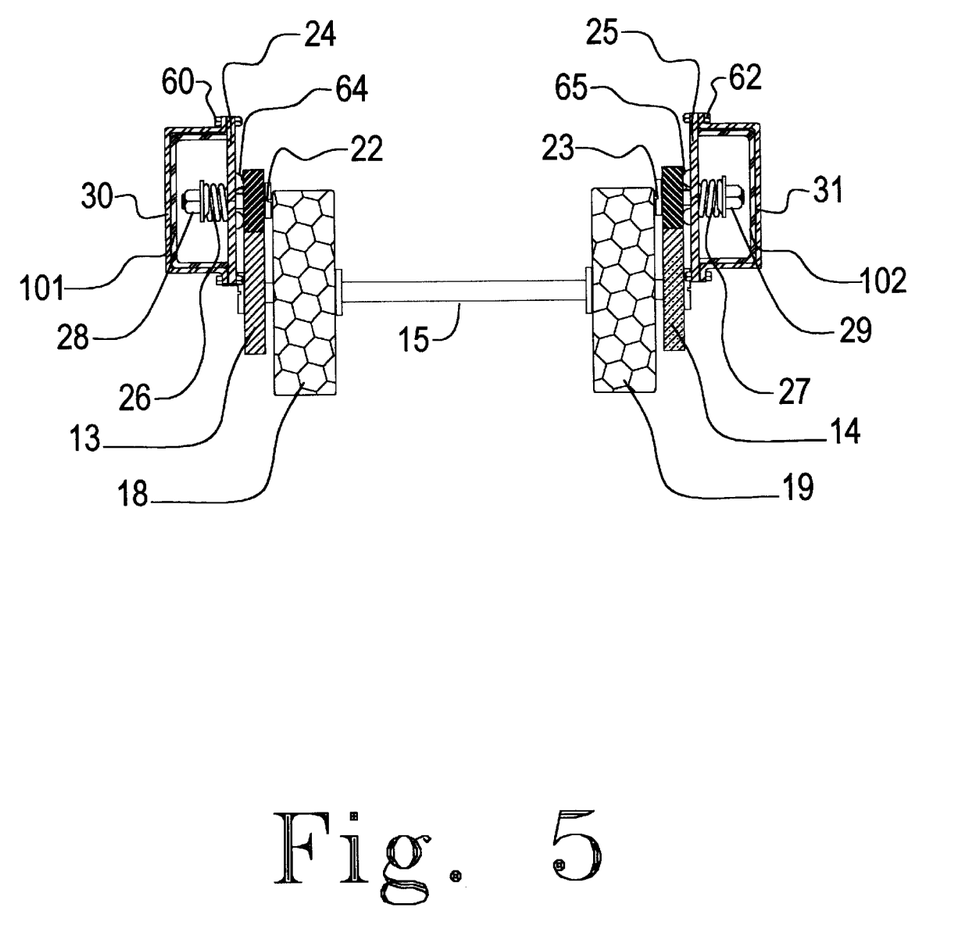
FIG. 5 is a cross sectional view taken along line 5—5 in FIG. 2.

With reference to FIGS. 3–5, the component parts of the landing gear assembly A will be disclosed. The landing gear assembly A includes a first arm 13 and a second arm 14. The first arm 13 is connected to the second arm 14 by an axle 15. The first arm 13 is connected to the axle 15 via a first screw 16. The second arm 14 is connected to the axle 15 via a second screw 17. Although screws have been illustrated, it should be noted that bolts, rivets, welds, nails, or other types of known fasteners could be used instead of the first and second screws 16 and 17. Alternatively, the first arm 13, the second arm 14 and the axle 15 could be integrally formed as a single unit.

A first wheel 18 and a second wheel 19 are mounted on the axle 15. The first wheel 18 and the second wheel 19 are freely rotatable about the axle 15 and may contain bearings, bushings, or the like to facilitate their rotation about the axle 15. The first wheel 18 is prevented from sliding along the axle 15 toward the second wheel 19 by a first retaining washer 20. Likewise, the second wheel 19 is prevented from sliding along the axle 15 toward the first wheel 18 by a second retaining washer 21. Third and fourth retaining washers (not shown) may be included to keep the first and second wheels 18 and 19 from sliding along the axle 15 in directions away from each other. Alternatively, an inner hub of the first and second wheels 18 and 19 may be allowed to abut against the first and second arms 13 and 14, respectively.

With reference to FIGS. 3 and 5, a first retaining pin 22 is inserted though a hole in the first arm 13, adjacent an end of the first arm 13. The first retaining pin 22 may be constructed in various manners. For example, the first retaining pin 22 may be a threaded cylindrical member, such as a machine screw or a bolt. A head of the first retaining pin 22 abuts the first arm 13 and prevents the first retaining pin 22 from passing through the hole in the first arm 13.

A portion of the first retaining pin 22, projecting from the first arm 13, is inserted through a hole in a first bracket. The first bracket may take the form of a substantially planar first plate 24. A first spring 26 encircles a portion of the first retaining pin 22, projecting from the first plate 24. A first nut 28 is threaded onto an end of the first retaining pin 22, in order to secure the first arm 13 to the first plate 24, in a manner which allows pivoting of the first arm 13 relative to the first plate 24. Of course, other types of pivot-allowing attachments could be used to attach the first arm 13 to the first plate 24.

In order to attach the first plate 24 to the ladder C, the first plate 24 is abutted against an inside portion of the first step side rail 101, above the uppermost step 110 and just below the top cap 120. The first spring 26 and first nut 28 connected to the first retaining pin 22 are positioned inside an inward facing U-shaped channel of the first step side rail 101. Next, a second bracket in the form of a C-shaped first member 30 is placed around an outer periphery of the first step side rail 101. Finally, a plurality of first fasteners 60, such as bolt/nut combinations, are inserted through an aligned first plurality of through first holes 61 formed around the edges of the first member 30 and the first plate 24. The first member 30, the first plate 24, and the plurality of first fasteners 60 constitute a first base, about which the first arm pivots.

The plurality of first fasteners 60 attach the first plate 24 to the first step side rail 101 in a secure manner, via a clamping friction. In order to improve the frictional attachment, it is possible to insert a friction-increasing pad, such as a rubber mat, between the first plate 24 and/or the first member 30 and the first step side rail 101. In order to improve the pivoting action of the first arm 13 relative to the first plate 24, it is possible insert a first bearing 64 between the first arm 13 and the first plate 24, as illustrated in FIG. 5, The ladder C illustrated has the inward facing U-shaped channel formed in the first step side rail 101, as is common with ladders constructed of fiberglass or aluminum. However, it is important to note that it would also be possible to attach the first plate 24 to ladders with other configurations. For example, a wooden ladder could have a recess bored into it, or a hole drilled though it, in order to accommodate the first spring 26 and the first nut 28 connected to the first retaining pin 22.

Figure 6:
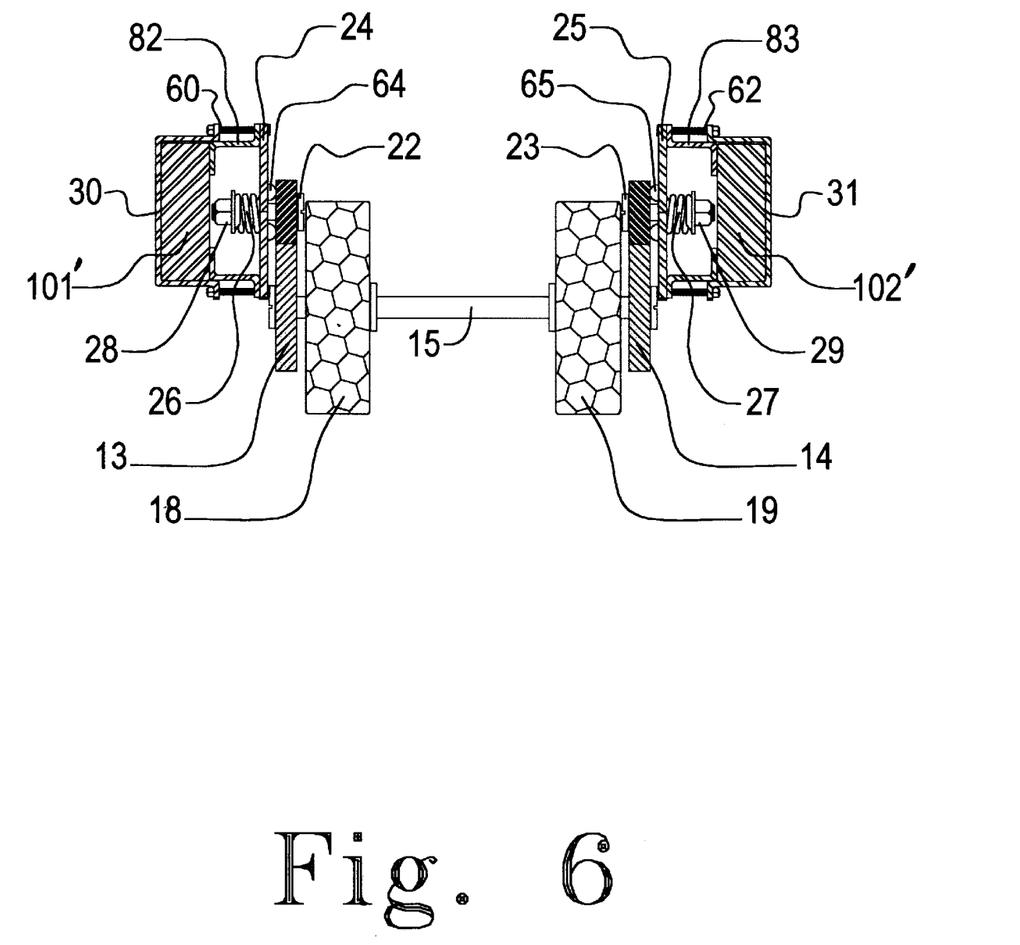
FIG. 6 is a cross sectional view, similar to FIG. 5, illustrating an alternative embodiment for attaching the landing gear assembly to the ladder.

However, in a preferred alternative embodiment, as illustrated in FIG. 6, the first plate 24 could include a first open ended box 82. The first open ended box 82 would provide an offset from the solid first step side rail 101' for accommodating the first spring 26 and the first nut 28 connected to the first retaining pin 22.

The second arm 14 is attached to a second base and to the second step side rail 102 in a manner analogous to the attachment of the first arm 13 to the first base and the first step side rail 101. In other words, the attachment of the second arm 14 involves a third bracket in the form of a second plate 25, a second retaining pin 23, a second spring 27, a second nut 29, a fourth bracket in the form of a second U-shaped member 31, a plurality of second fasteners 62, a plurality of second through holes 63, and a second bearing 65. Further, in the case of a solid second step side rail 102', the second plate 25 could include a second open ended box 83, as illustrated in FIG. 6.

Figure 7:
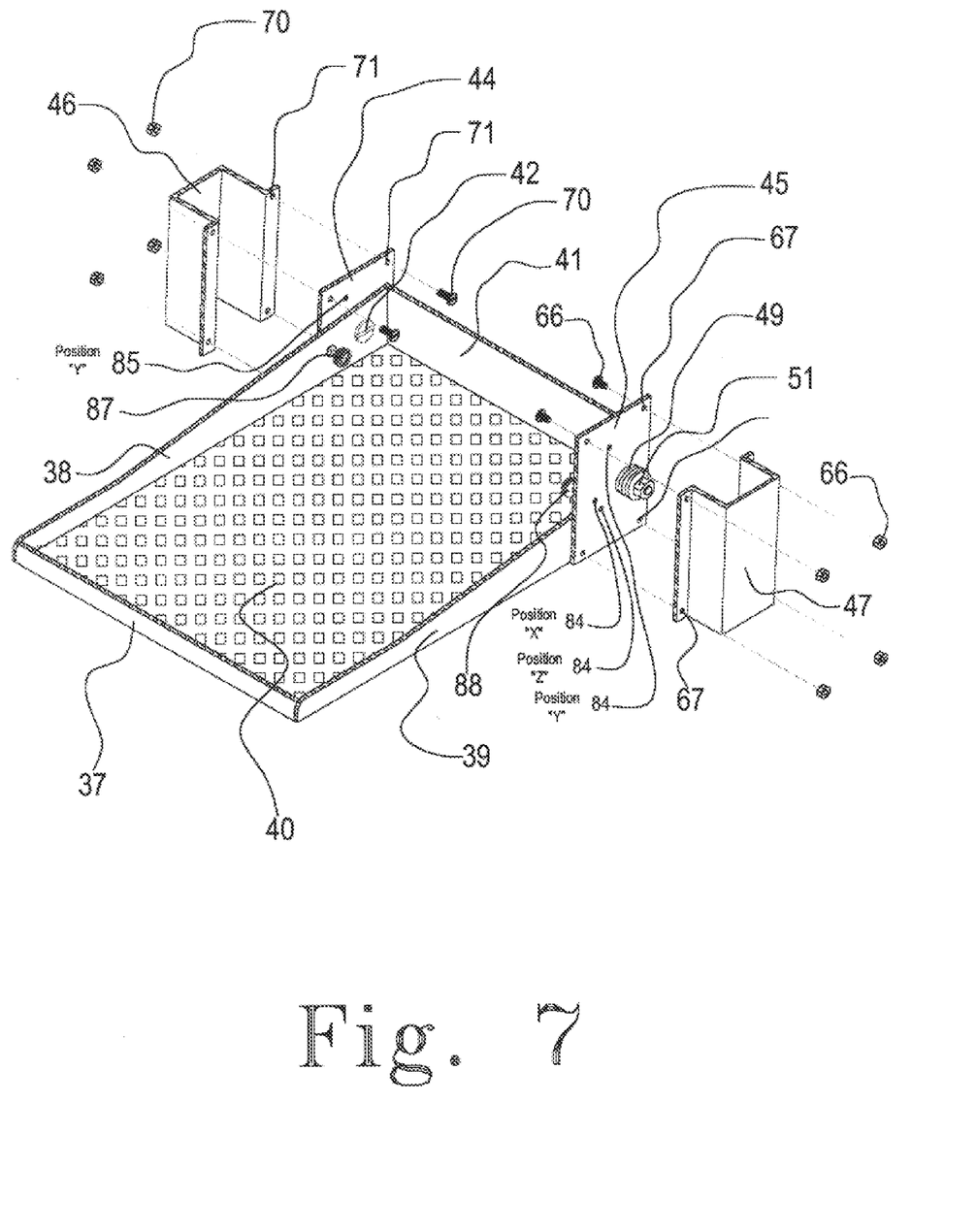
FIG. 7 is an exploded view of a carry plate assembly.
Figure 8:
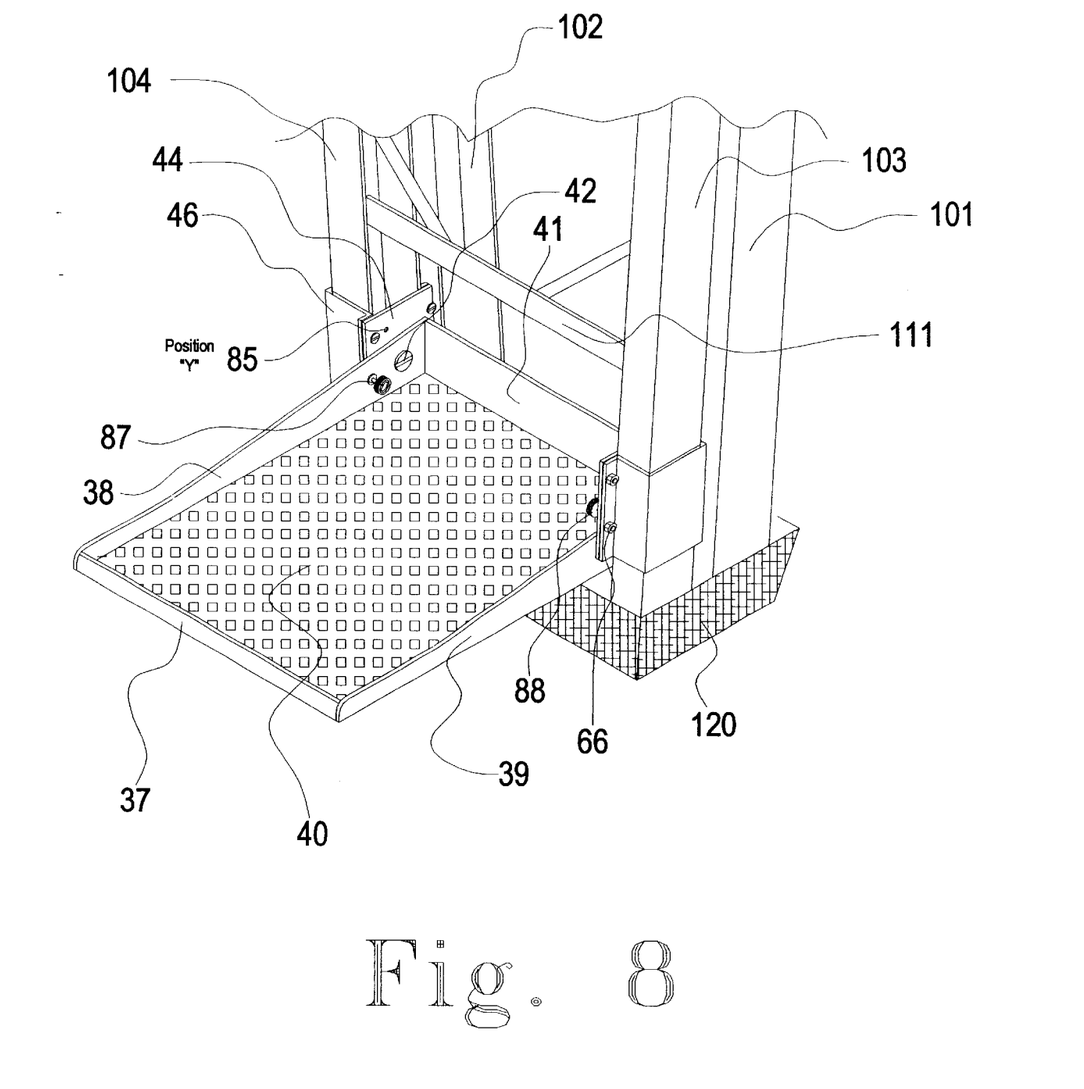
FIG. 8 is a close-up view of the carry plate assembly in a deployed condition.
Figure 9:
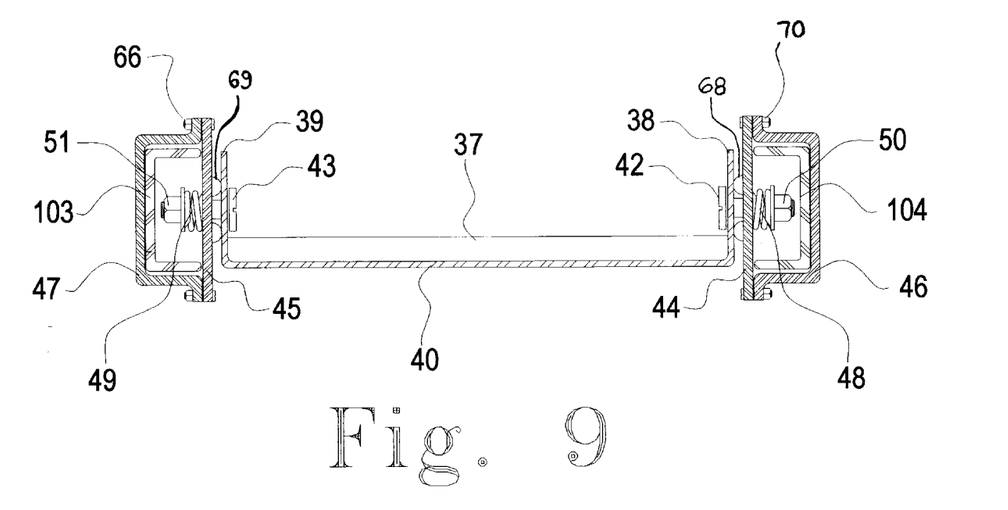
FIG. 9 is a cross sectional view taken along line 9—9 in FIG. 2.

With reference to FIGS. 7–9, the component parts of the carry plate assembly B will be disclosed. The carry plate assembly B includes a platform 40. The platform 40 is a generally planar member with upper and lower surfaces. One or both of the upper and lower surfaces may include pleating, or other forms of anti-slip surfacing or anti-slip coatings.

The platform 40 is bordered on a forward edge by a first lip 37, on a rearward edge by a second lip 41, on a first side edge by a third lip 39, and on a second side edge by a fourth lip 38. The first, second, third and fourth lips 37, 41, 39, 38 extend away from the upper surface of the platform 40 at an angle of approximately ninety degrees, and serve to keep items placed on the platform 40 from sliding off an edge of the platform 40. In a preferred embodiment, the second lip 41 extends furthest away from the platform 40. Also, in the preferred embodiment, the third lip 39 and the fourth lip 38 are angled or slopping from the relatively higher second lip 41 to the relatively lower first lip 37.

With reference to FIGS. 7 and 9, a third retaining pin 43 is inserted through a hole in the third lip 39, adjacent an end of the third lip 39. The third retaining pin 43 may be constructed in various manners, as suggested in reference to the first retaining pin 22, discussed above. A head of the third retaining pin 43 abuts the third lip 39 and prevents the third retaining pin 43 from passing through the hole in the third lip 39.

A portion of the third retaining pin 43, projecting from the third lip 39, is attached to a first foundation by insertion through a hole in a third plate 45. A third spring 49 encircles a portion of the third retaining pin 43, projecting from the third plate 45. A third nut 51 is threaded onto an end of the third retaining pin 43, in order to secure the third lip 39 to the third plate 45, in a manner which allows pivoting of the third lip 39 relative to the third plate 45. Of course, other types of pivot-allowing attachments could be used to attach the third lip 39 to the third plate 45.

In order to attach the third plate 45 to the ladder C, the third plate 45 is abutted against an inside portion of the first brace side rail 103 above the uppermost cross brace 111 and just below the top cap 120. The third spring 49 and third nut 51 connected to the third retaining pin 43 are positioned inside an inward facing U-shaped channel of the first brace side rail 103. Next, a third member 47, having a substantially C-shaped profile, is placed around an outer periphery of the first brace side rail 103. Finally, a plurality of third fasteners 66, such as bolt/nut combinations, are inserted through an aligned plurality of through holes 67 formed around the edges of the third member 47 and the third plate 45.

The plurality of third fasteners 66 attach the third plate 45 to the first brace side rail 103 in a secure manner, via a clamping friction. In order to improve the frictional attachment, it is possible to insert a friction-increasing pad, such as a rubber mat, between the third plate 45 and/or the third member 47 and the first brace side rail 103. In order to improve the pivoting action of the third lip 39 relative to the third plate 45, it is possible insert a third bearing 69 between the third lip 39 and the third plate 45, as illustrated in FIG. 9.

The ladder C has an inward facing U-shaped channel formed in the first brace side rail 103, as is common with ladders constructed of fiberglass or aluminum. However, it is important to note that it would also be possible to attach the third plate 45 to ladders with other configurations. For example, a wooden ladder could have a recess bored into it, or a hole drilled though it, in order to accommodate the third spring 49 and the third nut 51 connected to the third retaining pin 43.

Figure 10:
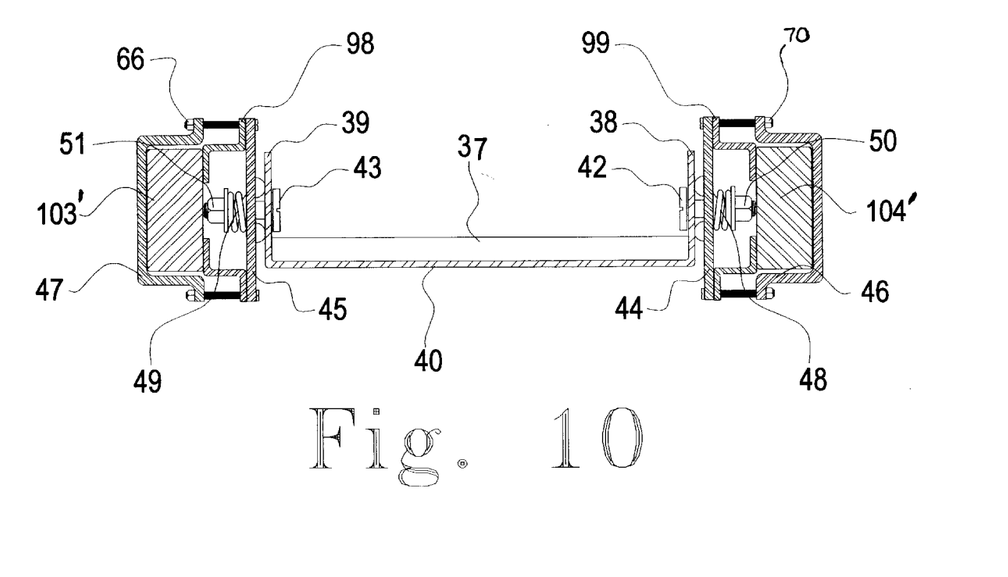
FIG. 10 is a cross sectional view, similar to FIG. 9, illustrating an alternative embodiment for attaching the carry plate assembly to the ladder.

However, in a preferred alternative embodiment, as illustrated in FIG. 10, the third plate 45 could include a third open ended box 98. The third open ended box 98 would provide an offset from the solid first brace side rail 103' for accommodating the third spring 49 and the third nut 51 connected to the third retaining pin 43.

The fourth lip 38 is attached to a second foundation and to the second brace side rail 104 in a manner analogous to the attachment of the third lip 39 to the first foundation and the first brace side rail 103. In other words, the attachment of the fourth lip 38 involves a fourth plate 44, a fourth retaining pin 42, a fourth spring 48, a fourth nut 50, a fourth member 46, a plurality of fourth fasteners 70, a plurality of fourth through holes 71, and a fourth bearing 68. Further, in the case of a solid second brace side rail 104', the fourth plate 44 could include a fourth open ended box 99, as illustrated in FIG. 10.

Although the present invention has been illustrated in conjunction with an A-frame type stepladder, it would be possible to apply the present invention to other types of ladders. For example, in the case of a telescoping ladder, the landing gear assembly A could be attached to one telescoping section of the ladder, while the carry plate assembly B could be applied to another telescoping section of the ladder.

One advantage of the present invention can be seen in that a pivotable linkage, formed by the first and second arms 13 and 14, has the ability to place the first and second wheels 18 and 19 into one of two positions. In a first position, the first and second wheels 18 and 19 are located between an uppermost step of the plurality of steps 110 and the top cap 120. In a second position, the first and second wheels extend away from the ladder C, and are spaced from a side edge of the top cap 120.

In the first position, the first and second wheels 18 and 19 do not interfere with use of the ladder C when the ladder is in the ready-for-use mode. Also, in the first position, the first and second wheels 18 and 19 do not change the outer profile of the ladder C when the ladder C is folded together in the storage mode.

To achieve the second position, the first and second wheels 18 and 19 are rotated in an outward fashion approximately 110 degrees from the first position. In the second position, the first and second wheels 18 and 19 sufficiently clear an outer edge of the top cap 120 so that an inverted and closed ladder C may be tilted back and the weight of the ladder, and any items on the carry plate assembly B, are born by the first and second wheels 18 and 19.

Of course, it would be possible to have the first and second wheels 18, 19 locatable in a third position. For example, the third position might overextend the first and second wheels 18 and 19, putting them beyond the plane of the top cap 120. For example, the first and second wheels 18 and 19 might be rotated 140 degrees from the first position to achieve the third position. Such a third position might be useful when pushing or pulling the ladder C in the hand truck mode over rough terrain or through high grass.

Although the landing gear assembly A and carry plate assembly B have been illustrated as having no bias toward any given position, it would be possible to bias one or both to a particular position. For example, the first and second wheels 18 and 19 could be spring biased to stay in the first position. In order to place the first and second wheels 18 and 19 into the second position, one would need to move the first and second wheels 18 and 19 against the spring bias and lock them in place using a locking device. A spring-loaded pin assembly, as will be later discussed, is utilized in order to lock the landing gear assembly A into one of the first or second positions.

Likewise, as illustrated in FIG. 2, the platform 40 could be spring biased to a position X adjacent to the first and second brace side rails 103 and 104. In order to place the platform 40 into a position Y, one would need to move the platform 40 against the spring bias and then lock it into place using a locking device. The position Y could correspond to an angle of approximately ninety degrees relative to the first and second brace side rails 103 and 104. The position Y would be suitable for use of the carry plate assembly B when the ladder C is in the hand truck mode.

It would also be possible to lock the platform 40 into a position Z. The position Z could correspond to an angle of approximately seventy-five degrees relative to the first and second brace side rails 103 and 104. The position Z would be suitable for use of a reverse side of the platform 40 as a paint bucket stand or work stand when the ladder C is in the ready-to-use mode. Again, a spring-loaded pin assembly, as discussed below, is utilized in order to lock the carry plate assembly B into one of the X, Y or Z positions.

As illustrated in FIGS. 3 and 4, a first spring-load pin 91 is threaded into a threaded into a through hole in the first arm 13. The first spring-loaded pin 91 includes a gripping head fixed to a shaft. The shaft is slideably mounted into a sleeve. The sleeve includes external threading, which is threaded into the through hole in the first arm 13.

The shaft is spring biased and tends to pull the gripping head towards the first arm 13, and tends to extend the shaft out of the through hole on a back side of the first arm 13, facing the first plate 24. The spring-load pin 91 is a commercially available, staple product.

The tip end of the shaft extending from the back side of the first arm 13 presses against the first plate 24. When the landing gear assembly A is located in the first position, the end of the shaft snaps into one of a pair of first locking holes 130. When the landing gear assembly A is located in the second position, the end of the shaft snaps into one of a pair of second locking holes 132. When the landing gear assembly A is transitioning between the first and second positions, the tip end of the shaft rides on, and traces an arc path across, a surface of the first plate 24, facing the first arm 13.

In order to disengage the shaft of the first spring-loaded pin 91 from within one of the first or second locking holes 130, 132, a user grips the gripping head. The gripping head is pulled away from the first arm 13, against the spring bias, until the shaft withdraws from the locking hole 130 or 132.

FIGS. 3 and 4 illustrate a second spring-loaded pin 92 threaded into the second arm 14. The second spring-loaded pin 92 functions in a manner analogous to the first spring-loaded pin 91. A shaft of the second spring-loaded pin 92 protrudes into the other of the pair of first locking holes 130, when the landing gear assembly A is in the first position. Further, the shaft of the second spring-loaded pin 92 protrudes into the other of the pair of second locking holes 132, when the landing gear assembly A is in the second position. Although first and second spring-loaded pins 91 and 92 have been illustrated, a single spring-loaded pin 91 or 92 could be provided to lock the landing gear assembly A into the first or second positions.

FIGS. 7 and 8 illustrate third and fourth spring-loaded pins 88 and 87. The third and fourth spring-loaded pins 88 and 87 are constructed in the same manner as the first and second spring-loaded pins 91 and 92. The third and fourth spring-loaded pins 88 and 87 are threaded into the third and fourth lips 39 and 38, respectively.

A pair of locking holes 84, 85 is provided for each of the three positions X, Y, and Z of the carrying plate assembly B. When the carry plate assembly B is located at one of the positions X, Y, or Z, the shafts of the third and fourth spring-loaded pins 88 and 87 will snap into one of the pairs of locking holes 84, 85. In order to move the carry plate assembly B from one of the positions X, Y or Z, the user pulls the gripping heads, of the third and fourth spring-loaded pins 88 and 87, toward each other. Pulling the gripping heads, releases the shafts from within the locking holes 84, 85.

A particular advantage of the present invention resides in the mounting system employed to attach the landing gear assembly A and the carry plate assembly B to the ladder C. Both are attached via frictional engagement. There is no need to drill holes or cut access guides into the ladder C. This attachment form is particularly advantageous, since removing material from the ladder could weaken the structural integrity of the ladder C, and alter the weight limits or ratings associated with the ladder C.

The frictional engagement also allows the landing gear assembly A and the carry plate assembly B to be easily removed from the ladder C. After the assemblies A and B are removed, the ladder C is restored to its original state. Therefore, a user can transfer the assemblies A and B to a new or different ladder.

No materials for construction have been assigned to the various component parts of the invention. It is envisioned by the inventor that practically any known material, or combination of materials, could be used in the fabrications of various ones of the component parts. For example, the first and second arms 13 and 14 could be formed of cast or forge metals, non-metallic composites, or even wood, such as plywood.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination comprising:
   a ladder including a plurality of steps, a first side rail and a second side rail;
   a base attached to at least one of said first or second side rails; and
   an assembly attached to said base proximate a top end of said ladder, said assembly including: a pivotable linkage, said pivotable linkage being pivotable between a first position and a second position relative to said base, and at least one wheel mounted to said pivotable linkage, wherein said at least one wheel is disposed between said first and second side rails when said pivotable linkage is in said first position, and wherein said ladder is an a-frame type stepladder, and further comprising:
   a top cap attached to said top end of said ladder, wherein said first position places said at least one wheel between an uppermost step of said plurality of steps and said top cap.

2. The combination according to claim 1, wherein said base includes:
   a first bracket and a second bracket, said first bracket abutting one side of said first side rail of said ladder, said second bracket abutting another side of said first side rail of said ladder; said pivotable linkage being attached to said first bracket; and
   at least one fastener for connecting said first bracket to said second bracket in order to frictionally fix said first bracket and said second bracket to said first side rail of said ladder.

3. The combination according to claim 2, wherein said plurality of steps are connected between said first side rail of said ladder and said second side rail of said ladder.

4. The combination according to claim 1, further comprising:
   a lock attached to at least one of said ladder and said pivotable linkage to secure said pivotable linkage in at least one of said first position and said second position.

5. The combination according to claim 4, wherein said lock is attached to said pivotable linkage and includes a pin extendable from said pivotable linkage for engaging in a first locking hole when said pivotable linkage is in said first position and for engaging in a second locking hole when said pivotable linkage is in said second position.

6. The combination according to claim 1, further comprising:
   a foundation fixed proximate said end of the ladder; and
   a platform attached to said foundation, said platform being pivotable between a third position and a fourth position relative to said foundation.

7. An assembly for attachment to a ladder, said assembly comprising:
   a base for fixing proximate an end of the ladder;
   a pivotable linkage attached to said base, said pivotable linkage being pivotable between a first position and a second position relative to said base; and
   at least one wheel mounted to said pivotable linkage, wherein said at least one wheel is disposed between a first side rail of the ladder and a second side rail of the ladder and between an uppermost step and a top cap of the ladder when said pivotable linkage is in said first position.

8. The assembly according to claim 7, wherein said pivotable linkage includes an axle, and said at least one wheel includes a first wheel and a second wheel mounted to rotate about said axle.

9. The assembly according to claim 8, wherein said base is a first base and further comprising:
   a second base for fixing proximate the end of the ladder, wherein said pivotable linkage includes a first arm pivotally connected to said first base and a second arm pivotally connected to said second base, and wherein said axle is connected between said first arm and said second arm.

10. The assembly according to claim 7, wherein said base includes a first bracket and a second bracket, said first bracket for abutting one side of the first side rail of the ladder, said second bracket for abutting another side of the first side rail of the ladder; and at least one first fastener for connecting said first bracket to said second bracket in order to frictionally fix said first bracket and said second bracket to the first side rail of the ladder.

11. The assembly according to claim 10, wherein said base is a first base and further comprising:
   a second base for fixing proximate the end of the ladder, said second base including a third bracket and a fourth bracket, said third bracket for abutting one side of the second side rail of the ladder, said fourth bracket for abutting another side of the second side rail of the ladder; and at least one second fastener for connecting said third bracket to said fourth bracket in order to frictionally fix said third bracket and said fourth bracket to the second side rail of the ladder, wherein said pivotable linkage is also attached to said third bracket.

12. The assembly according to claim 11, wherein said pivotable linkage includes a first arm connected to said first bracket, a second arm connected to said third bracket, and an axle connected between said first arm and said second arm, and wherein said at least one wheel includes a first wheel and a second wheel mounted to rotate about said axle.

13. The assembly according to claim 11, wherein said first bracket is a substantially planar first plate, said second bracket is a substantially c-shaped first member for partially surrounding the first side rail, said third bracket is a substantially planar second plate, and said fourth bracket is a substantially c-shaped second member for partially surrounding the second side rail.

14. The assembly according to claim 7, further comprising:
   a foundation for fixing proximate the end of the ladder; and
   a platform attached to said foundation, said platform being pivotable between a third position and a fourth position relative to said foundation.

15. The assembly according to claim 14, wherein said foundation is a first foundation and further comprising:
   a second foundation for fixing proximate the end of the ladder, wherein said platform is attached to said second foundation, and wherein said first foundation is for attachment to a first brace side rail of the ladder and said second foundation is for attachment to a second brace side rail of the ladder.

16. The assembly according to claim 7, further comprising:
a lock attached to at least one of said base and said pivotable linkage to secure said pivotable linkage in at least one of said first position and said second position.

17. The assembly according to claim 16, wherein said lock includes a pin extendable from said pivotable linkage for engaging in a first locking hole formed in said base when said pivotable linkage is in said first position and for engaging in a second locking hole formed in said base when said pivotable linkage is in said second position.

18. An assembly for attachment to a ladder, said assembly comprising:
a base for fixing proximate an end of the ladder, said base including a first bracket and a second bracket, said first bracket for abutting one side of a first side rail f the ladder, said second bracket for abutting another side of the first side rail of the ladder; and at least one first fastener for connecting said first bracket to said second bracket in order to frictionally fix said first bracket and said second bracket to the first side rail of the ladder;
a pivotable linkage attached to said first bracket, said pivotable linkage being pivotable between a first position and a second position relative to said first bracket; and
at least one wheel mounted to said pivotable linkage, wherein said at least one wheel is disposed between the first side rail of the ladder and a second side rail of the ladder and between an uppermost step and a top cap of the ladder when said pivotable linkage is in said first position.

19. The assembly according to claim 18, wherein said pivotable linkage includes an axle, and said at least one wheel includes a first wheel and a second wheel mounted to rotate about said axle.

20. The assembly according to claim 18, wherein said base is a first base and further comprising:
a second base for fixing proximate the end of the ladder, said second base including a third bracket and a fourth bracket, said third bracket for abutting one side of the second side rail of the ladder, said fourth bracket for abutting another side of the second side rail of the ladder; and at least one second fastener for connecting said third bracket to said fourth bracket in order to frictionally fix said third bracket and said fourth bracket to the second side rail of the ladder, wherein said pivotable linkage is also attached to said third bracket.

21. The assembly according to claim 20, wherein said pivotable linkage includes a first arm connected to said first bracket, a second arm connected to said third bracket, and an axle connected between said first arm and said second arm, and wherein said at least one wheel includes a first wheel and a second wheel mounted to rotate about said axle.

* * * * *